US012699165B2

(12) United States Patent
Leye et al.

(10) Patent No.:     US 12,699,165 B2
(45) Date of Patent:          Aug. 4, 2026

(54) PROCESS FOR ACCURATE RADAR CROSS-SECTION EVALUATION USING RECONFIGURABLE INTELLIGENT SURFACES

(71) Applicant: Technology Innovation Institute, Masdar City (AE)

(72) Inventors: Papa Ousmane Leye, Abu Dhabi (AE); Adamo Banelli, Abu Dhabi (AE); Chaouki Kasmi, Abu Dhabi (AE); Felix Vega, Abu Dhabi (AE); Islem Yahi, Abu Dhabi (AE); Shaikha Aldhaheri, Abu Dhabi (AE); Mae Almansoori, Abu Dhabi (AE)

(73) Assignee: Technology Innovation Institute—Sole Proprietorship LLC, Masdar City (AE)

( * ) Notice:     Subject to any disclaimer, the term of this patent is extended or adjusted under 35 U.S.C. 154(b) by 263 days.

(21) Appl. No.: 18/668,693

(22) Filed:     May 20, 2024

(65)               Prior Publication Data

US 2024/0402297 A1      Dec. 5, 2024

(30)          Foreign Application Priority Data

May 30, 2023     (AE) ........................... P6001287/2023

(51) Int. Cl.
  *G01S 7/41*               (2006.01)
  *G01S 7/02*               (2006.01)
               (Continued)

(52) U.S. Cl.
  CPC ................ *G01S 7/41* (2013.01); *G01S 7/024* (2013.01); *G01S 7/282* (2013.01); *G01S 7/285* (2013.01)

(58) Field of Classification Search
  None
  See application file for complete search history.

(56)               References Cited

U.S. PATENT DOCUMENTS 8,482,465 B1 *   7/2013  Hemmady ............... H01Q 9/04
                                                    333/262
2010/0201564 A1   8/2010  Foster et al.
               (Continued)

FOREIGN PATENT DOCUMENTS

CN         108627811        10/2018
CN         112986903        6/2021
               (Continued)

OTHER PUBLICATIONS

Search Report of AE Application No. P6001287/2023, dated May 31, 2024, 8 pages.
               (Continued)

*Primary Examiner* — Bernarr E Gregory
(74) *Attorney, Agent, or Firm* — DLA Piper LLP (US)

(57)               ABSTRACT

A radar cross-section (RCS) measurement system comprising a reconfigurable intelligent surface (RIS) transceiver positioned relative to a first illumination direction of a target under test (TUT), a RIS reflector positioned relative to a second illumination direction of the TUT, and a controller. The controller is configured to control the RIS transceiver to transmit an electromagnetic (EM) wave towards the first illumination direction of the TUT and the RIS reflector, control the RIS reflector to reflect the EM wave received from the RIS transceiver towards the second illumination direction of the TUT, control the RIS reflector to reflect a scattering of the EM wave received from the second illumination direction of the TUT back to the RIS transceiver, and compute the RCS of the TUT in the second illumination
               (Continued)

direction of the TUT based on the scattering of the EM wave received from the RIS reflector.

20 Claims, 8 Drawing Sheets

(51) Int. Cl.
  G01S 7/282 (2006.01)
  G01S 7/285 (2006.01)

(56) References Cited

U.S. PATENT DOCUMENTS

| | | | |
|---|---|---|---|
| 2021/0239797 A1 | 8/2021 | Cattle et al. | |
| 2021/0302561 A1* | 9/2021 | Bayesteh | G01S 13/42 |
| 2022/0278738 A1* | 9/2022 | Dai | G01S 7/006 |
| 2022/0365167 A1* | 11/2022 | Zhang | G01S 13/765 |
| 2023/0408677 A1* | 12/2023 | Duan | G01S 7/006 |
| 2024/0322864 A1* | 9/2024 | Yapici | G01S 13/75 |

FOREIGN PATENT DOCUMENTS

| | | |
|---|---|---|
| JP | 2010-266423 | 11/2010 |
| JP | 2022-143300 | 10/2022 |
| RU | 2510041 | 3/2014 |
| WO | 2020161703 | 8/2020 |
| WO | 2024052817 | 3/2024 |
| WO | 2024087048 | 5/2024 |

OTHER PUBLICATIONS

International Search Report and Written Opinion for International Application No. PCT/IB2024/054905, mailed Jul. 3, 2024, 09 Pages.
Office Action for United Arab Emirates Patent Application No. P6001287/2023, dated Feb. 14, 2025, 1 page.

* cited by examiner

PROCESS FOR ACCURATE RADAR CROSS-SECTION EVALUATION USING RECONFIGURABLE INTELLIGENT SURFACES

CROSS-REFERENCE TO RELATED APPLICATIONS

This application claims priority to United Arab Emirates Patent Applicated No. P6001287/2023, filed May 30, 2023, which is incorporated by reference in its entirety.

FIELD

A system and method for accurate radar cross-section evaluation using reconfigurable intelligent surfaces.

BACKGROUND

Different types of radar cross-section (RCS) measurement techniques and methods for RCS prediction have been developed and used for many decades. Compact range measurement systems are one of the most popular systems for RCS measurement. Nevertheless, existing RCS measurement systems and methods for RCS prediction suffer from various limitations which can significantly impact the predictions, the measurement data and the required time or cost to implement these systems/methods. RCS prediction software, for example, faces major limitations (high demand on computer resources, long runtimes, representativeness of the model, limitations on the approximation used in some algorithms, etc.) for predicting RCS for complex targets. In addition, even if compact range can significantly increase the size of the targets that can be measured, this conventional configuration still faces important design challenges including the reduction of the diffracted field from the edges of the reflector, reduction of quiet-zone ripple and achievement of large quiet zones at low frequencies. Furthermore, these systems must be carefully and continuously maintained, and calibrated for a minimum measurement error in the quiet zone (area of near-constant amplitude and phase). In addition, the design of the required chamber for performing accurate RCS measurement of target is expensive to build due to the need for a high accuracy and heavy-duty positioner for supporting the target, a high accuracy manufacturing feed reflector, and a fully anechoic measurement chamber. Most of these classical RCS measurement systems are also limited to monostatic RCS measurements using a fixed transmit/receive antenna and rotating the target to measure the various surfaces (e.g., sides) of the target. Also, the shaped pylon or foam column support for the target in classical RCS measurement chambers limit the available diffraction zone by casting a shadow behind the support. This produces an unwanted interaction between the support and the target and results in an unwanted contribution to the backscattered field.

SUMMARY

In one aspect, the present disclosure relates to a radar cross-section (RCS) measurement system comprising a reconfigurable intelligent surface (RIS) transceiver positioned relative to a first illumination direction of a target under test (TUT), a RIS reflector positioned relative to a second illumination direction of the TUT, and a controller. The controller is configured to control the RIS transceiver to transmit an electromagnetic (EM) wave towards the first illumination direction of the TUT and the RIS reflector, control the RIS reflector to reflect the EM wave received from the RIS transceiver towards the second illumination direction of the TUT, control the RIS reflector to reflect a scattering of the EM wave received from the second illumination direction of the TUT back to the RIS transceiver, and compute the RCS of the TUT in the second illumination direction of the TUT based on the scattering of the EM wave received from the RIS reflector.

In some embodiments of this aspect, the controller is further configured to compute the RCS of the TUT in the first illumination direction of the TUT based on a scattering of the EM wave received from the first illumination direction of the TUT.

In some embodiments of this aspect, the disclosed radar cross-section (RCS) measurement system according to any one of the above example embodiments can have a plurality of RIS reflectors including the RIS reflector and at least one additional RIS reflector, the plurality of RIS reflectors respectively positioned relative to a plurality of illumination directions of the TUT. The controller is further configured to control the plurality of RIS reflectors to reflect the EM wave received from the RIS transceiver towards the plurality of illumination directions of the TUT, control the plurality of RIS reflectors to reflect a plurality of scatterings of the EM wave received from the plurality of illumination directions of the TUT back to the RIS transceiver, and compute a plurality of RCSs of the TUT in the plurality of illumination directions of the TUT based on plurality of scatterings of the EM wave received from the plurality of illumination directions of the TUT.

In some embodiments of this aspect, according to any one of the above example embodiments, the plurality of illumination directions includes at least six illumination directions, and the computed RCS of the TUT is a three-dimensional RCS computed with respect to the six illumination directions.

In some embodiments of this aspect, according to any one of the above example embodiments, the controller is further configured to control an angle of reflection of the RIS reflector by adjusting impedance of respective reflective elements of the RIS reflector.

In some embodiments of this aspect, according to any one of the above example embodiments, the RIS reflector is configured to receive EM waves and the controller is further configured to measure a bi-static radar RCS of the TUT by processing the scattering of the EM wave from the second illumination direction of the TUT received by the RIS reflector.

In some embodiments of this aspect, according to any one of the above example embodiments, the EM wave has vertical polarization or horizontal polarization and the controller is further configured to compute a vertical polarization RCS or a horizontal polarization RCS of the TUT.

In some embodiments of this aspect, according to any one of the above example embodiments, the controller is further configured to control the RIS transceiver and RIS reflector to control an angle of incidence of the EM wave on the TUT.

In some embodiments of this aspect, according to any one of the above example embodiments, the RIS transceiver transmits in a plurality of RF bands, and the RIS reflector reflects in the plurality of RF bands.

In some embodiments of this aspect, according to any one of the above example embodiments, the system further comprises a support for statically positioning the TUT relative to the RIS transceiver and RIS reflector during the RCS measurement.

In some embodiments of this aspect, according to any one of the above example embodiments, the controller is configured to control the RIS transceiver to transmit the EM wave in a specified frequency band, and control the RIS reflector to reflect the EM wave in the specified frequency band, wherein the specified frequency band is adjustable.

In some embodiments of this aspect, according to any one of the above example embodiments, the controller is further configured to compute the RCS of the TUT from a point of view a land-based radar system, an air-based radar system, and a satellite-based radar system.

In one aspect, the present disclosure relates to a radar cross-section (RCS) measurement system comprising a first reconfigurable intelligent surface (RIS) transceiver positioned relative to a first illumination direction of a target under test (TUT), a second RIS transceiver positioned relative to a second illumination direction of the TUT, and a controller. The controller is configured to control the first RIS transceiver to transmit an electromagnetic (EM) wave towards the first illumination direction of the TUT and the second RIS transceiver, control the second RIS transceiver to receive a scattering of the EM wave received from the TUT, and compute the RCS of the TUT in the first illumination direction of the TUT based on the scattering of the EM wave received from the TUT.

In some embodiments of this aspect, according to any one of the above example embodiments, the controller is further configured to control the second RIS transceiver to transmit an EM wave towards the second illumination direction of the TUT and the first RIS transceiver, control the first RIS transceiver to receive a scattering of the EM wave received from the TUT, and compute the RCS of the TUT in the second illumination direction of the TUT based on the scattering of the EM wave received from the TUT.

In some embodiments of this aspect, according to any one of the above example embodiments, the system further comprises a plurality of RIS transceivers including the first RIS transceiver, the second RIS transceiver and at least one additional RIS transceiver, the plurality of RIS transceivers respectively positioned relative to a plurality of illumination directions of the TUT, wherein the controller is further configured to control the plurality of RIS transceivers to transmit and receive the EM wave towards the plurality of illumination directions of the TUT, and compute a plurality of RCSs of the TUT in the plurality of illumination directions of the TUT based on plurality of scatterings of the EM wave received from the plurality of illumination directions of the TUT.

In some embodiments of this aspect, according to any one of the above example embodiments, the plurality of illumination directions includes at least six illumination directions and the computed RCS of the TUT is a three-dimensional RCS computed with respect to the six illumination directions.

In some embodiments of this aspect, according to any one of the above example embodiments, the controller is further configured to control an angle of reflection of the RIS reflector by adjusting impedance of respective reflective elements of the RIS reflector.

In some embodiments of this aspect, according to any one of the above example embodiments, the EM wave has vertical polarization or horizontal polarization and the controller is further configured to compute a vertical polarization RCS or a horizontal polarization RCS of the TUT.

In some embodiments of this aspect, according to any one of the above example embodiments, the controller is further configured to control the first RIS transceiver and the second RIS transceiver to control an angle of incidence of the EM wave on the TUT.

In some embodiments of this aspect, according to any one of the above example embodiments, the first RIS transceiver and the second RIS transceiver transmit in a plurality of RF bands.

In some embodiments of this aspect, according to any one of the above example embodiments, the TUT is statically positioned relative to the first RIS transceiver and the second RIS transceiver during the RCS measurement.

In some embodiments of this aspect, according to any one of the above example embodiments, the controller is configured to control the first RIS transceiver to transmit the EM wave in a specified frequency band, and control the second RIS transceiver to receive the EM wave in the specified frequency band, wherein the specified frequency band is adjustable.

In some embodiments of this aspect, according to any one of the above example embodiments, the controller is further configured to compute the RCS of the TUT from a point of view a land-based radar system, an air-based radar system, and a satellite-based radar system.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 2B shows a block diagram of an RCS measurement system including a transceiver and a ceiling/floor reflectors for performing RCS measurements of a target, according to an example embodiment of the present disclosure.

DETAILED DESCRIPTION

Figure 1:
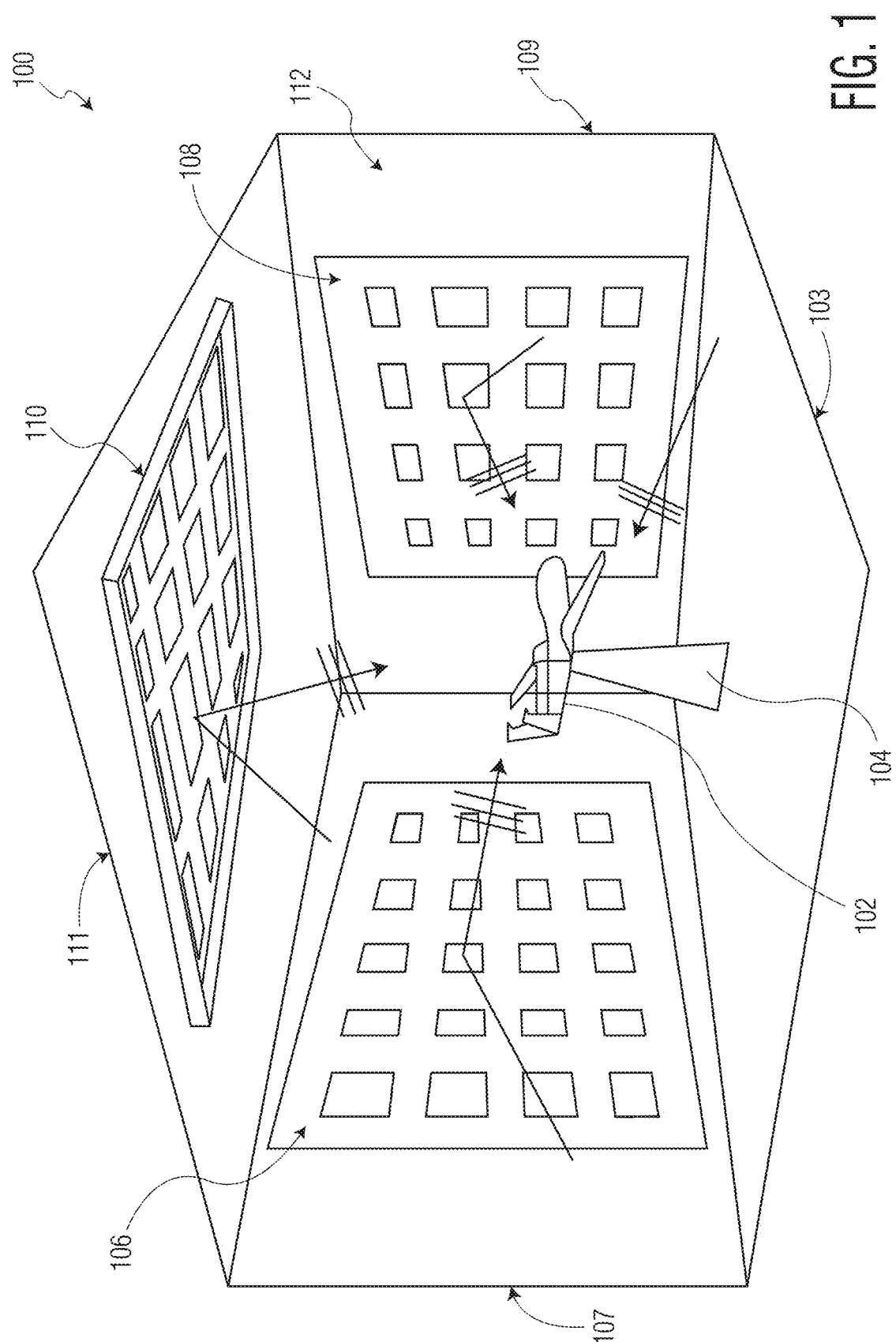
FIG. 1 shows an illustration of an RCS measurement chamber, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The disclosed methods, devices and systems herein overcome the limitations of the existing RCS measurement systems by utilizing reconfigurable intelligent surface (RIS) devices to perform RCS measurements of a target under test (TUT) for all illumination directions, polarizations and frequency bands without the need to move (e.g., rotate) the TUT or to change the antenna (e.g., for different polarization, etc.). The RIS devices may act as transceivers and/or reflectors to facilitate the RCS measurements within the anechoic chamber. In addition, since the TUT does not need to be rotated, the conventional high accuracy heavy-duty positioner for supporting the TUT is replaced with a less expensive low RCS target support or suspension cables that hold the TUT in a static position during RCS measurements while having minimal effect on the RCS measurements.

Practical applications of the disclosed methods, devices and systems herein include but are not limited to computing RCS for specific targets for development purpose (e.g., understanding scattering mechanisms, design verification, performance evaluation, diagnostics or troubleshooting), and for performance improvement for existing systems and specific field radar systems. For example, scale models of specific targets (e.g., known designs of airplanes, helicopters, missiles, etc.) can built and installed in the anechoic chamber. RCS measurements for these specific targets can then be captured and sent to field radar systems for comparison to RCS measurements of actual targets detected by the field radar systems. The comparison may include determining a correlation between the RCS of the actual target detected by the field radar system with the RCS measurements determined from the model target as disclosed herein. In other words, the RCS measurements made by the field radar system are compared to the RCS measurements for various TUTs to find a match, thereby allowing the field radar to accurately identify the actual target. This comparison may be performed based on single RCS measurement or a sequence of RCS measurements captured as the field target is moving. Furthermore, the RCS measurements for the specific targets may be performed using various operating parameters to model the characteristics of specific land-based, air-based and satellite-based field radar systems that operate in either monostatic or bistatic radar modes and in set polarizations and frequency bands. In other words, the RCS measurements performed by the methods, devices and systems herein are adaptable in order to mimic the behavior of any field based radar system, and therefore provide appropriate RCS measurements for use in the corresponding field radar systems.

Benefits of the disclosed methods, devices and systems include but are not limited to measuring RCS for all target illuminations directions without rotating the TUT, measuring RCS for different targets without the need to reconfigure the chamber, avoidance of a fully anechoic chamber, more accurate RCS measurements due to the absence of a bulky support for the TUT, ability to capture RCS measurements in various polarizations and frequency bands, ability to capture both monostatic and bi-static RCS measurements, ability to capture both vertical and horizontal polarization, and the ability to capture RCS measurements for use by land-based, air-based and satellite-based radar systems.

FIG. 1 shows an illustration of an RCS measurement chamber 100, according to an example embodiment of the present disclosure. In this example, RCS measurement chamber 100 includes 4 walls (2 of which are shown as walls 107 and 109, and 2 of which are not shown for viewing purposes), a ceiling 111 and a floor 103. Walls 107 and 109 include RIS panels 106 and 108, and ceiling 111 includes RIS panel 110. Although not shown, the floor 103 and the missing walls may also include RIS panels. It is noted that the RIS panels may cover the entire surface or a portion of the surface of the walls/ceiling/floor. Any surfaces that are not covered by the RIS panels may be covered by EM absorbing material 112. TUT 102 may be positioned within the chamber at a specified target location (e.g., center of the chamber) and mounted on a low profile stationary support 104 or suspended from the ceiling by low profile cables (not shown) that are designed to minimize interference with the EM waves used for RCS measurements.

In one example, at least one of the RIS panels is a transceiver for emitting an EM wave into the chamber, while the remaining RIS panels are intelligently controllable reflectors for reflecting the EM wave in various directions to illuminate TUT 102 from various illumination directions that are not directly visible to the transceiver RIS panel (e.g., a direction where a direct path is not present). This configuration allows the RCS measurement system to illuminate TUT 102 from all directions (front, back, left, right, above, below), and all azimuth and elevation illumination directions (angles of attack) to measure TUT 102 for all relevant angles of incidence, thereby producing a comprehensive 3-dimensional (3D) RCS measurement of TUT 102.

The RIS panels in FIG. 1 generally include a number of reflective elements (e.g., metallic patches) on a dielectric substrate. These reflective elements may have a size, shape and spacing distance designed to optimize RCS measurements in a specific radar frequency band. A copper backplane may be positioned between the dielectric substrate and the reflective elements to avoid EM leakage of waves incident on the RIS panel. The reflective elements also include a circuit (e.g., variable capacitor, PIN diode, etc.) for individually adjusting the impedance of the reflective elements which results in an adjustment of the phase of the transmitted or reflected EM wave from the reflective elements. The resolution of the impedance control may be quantized to a desired bit level (e.g., 6-bits) to achieve a given level of accuracy. A variable resistor may also be included in the circuit to adjust the amplitude of the transmitted or reflected EM wave from the reflective elements. Given the above-described functionality, a controller (not shown) can independently control the phase/amplitude of the reflective elements to adjust the direction, amplitude and wavefront of the transmitted or reflected EM wave from the RIS panels. This is beneficial for providing a system that can illuminate TUT 102 from all directions without having to move TUT 102 during or in between measurements. In other words, the system can adjust the RIS panels to measure the entire 3D surface of TUT 102 while maintaining TUT 102 in a stationary position.

Measurement chamber 100 may be a rectangular box with vertical sides and a horizontal floor as shown in FIG. 1, or may be other configurations (e.g., triangular, etc.). The RIS panels as shown in FIG. 1 may be integrated and lined (e.g., mounted) in the measurement chamber for an optimal illumination of the TUT given the location of the TUT within the chamber. The design of the RIS panels and their positions within the chamber ensure that the field produced in the TUT location is a plane wave. To ensure the plane wave conditions at the TUT, the phase taper across the TUT may be controlled to have a maximum variation of +/−5 degree. In addition, the amplitude of the incident field may deviate less than 0.5 dB at the highest operating frequency over its transverse and longitudinal extend. The placement of the RIS panels ensure a complete illumination of the TUT for all directions at a given angular resolution. Furthermore, positioning of the RIS panels and the TUT is optimized to minimize the contribution of unwanted multipath in the measurement results.

In general, TUT is illuminated via the RIS panels by passively focusing the incident signal on the direction of the target location. The RIS panels collimate the field into a beam of parallel rays in the direction of the TUT. As mentioned above, the design and location of the RIS panels are chosen so that the signal reflected from the RIS panels is approximately a plane wave at the location of the target. The electromagnetic field at the target is composed by the return (e.g., echo) corresponding to the desired illumination direction and the contribution of unwanted reflections from the measurement chamber. These unwanted contributions are gated in the postprocessing stage to distinguish between return from the target and unwanted reflections. A dedicated time domain windowing procedure is implemented in the postprocessing stage for this purpose. The phase data in addition to amplitude data may be measured for computing RCS for a given TUT. This measured data may be collected in either the time or frequency domain. The absolute RCS of the TUT is estimated using the measurement data of the TUT and reference measurement data of a reference target having an RCS that is known with a high degree of confidence at the frequencies of interest. In one example, the ratio of the measurement data of the TUT and the measurement data of the reference target produces a calibration coefficient to be applied to the measurement of the TUT. In one example, a metallic sphere or a metallic cylinder may be used as the reference target to determine the calibration coefficient for converting the RCS measurement of the TUT to an absolute RCS.

Figure 2A:
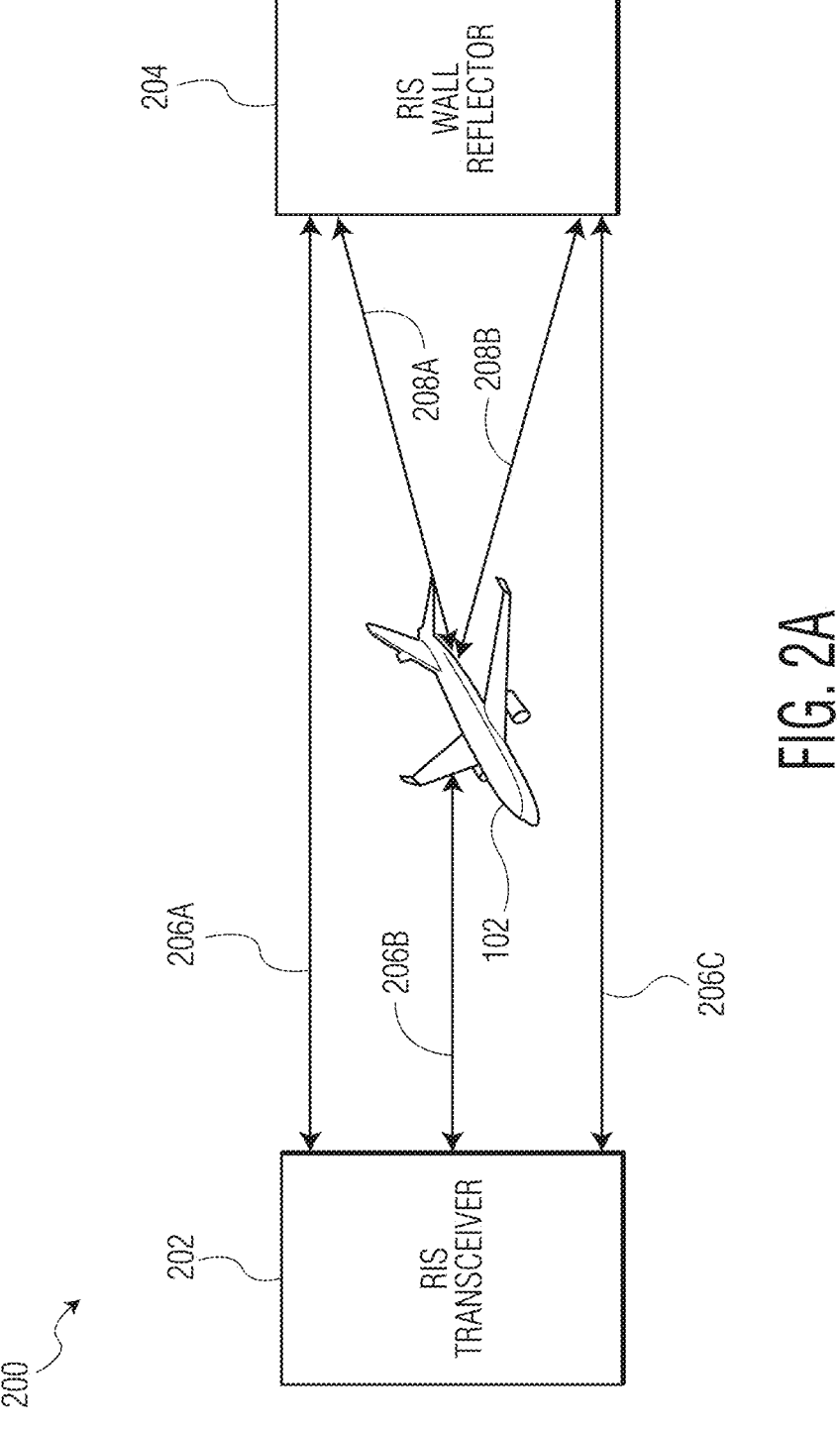
FIG. 2A shows a block diagram of an RCS measurement system including a transceiver and a wall reflector for performing RCS measurements of a target, according to an example embodiment of the present disclosure.
Figure 2B:
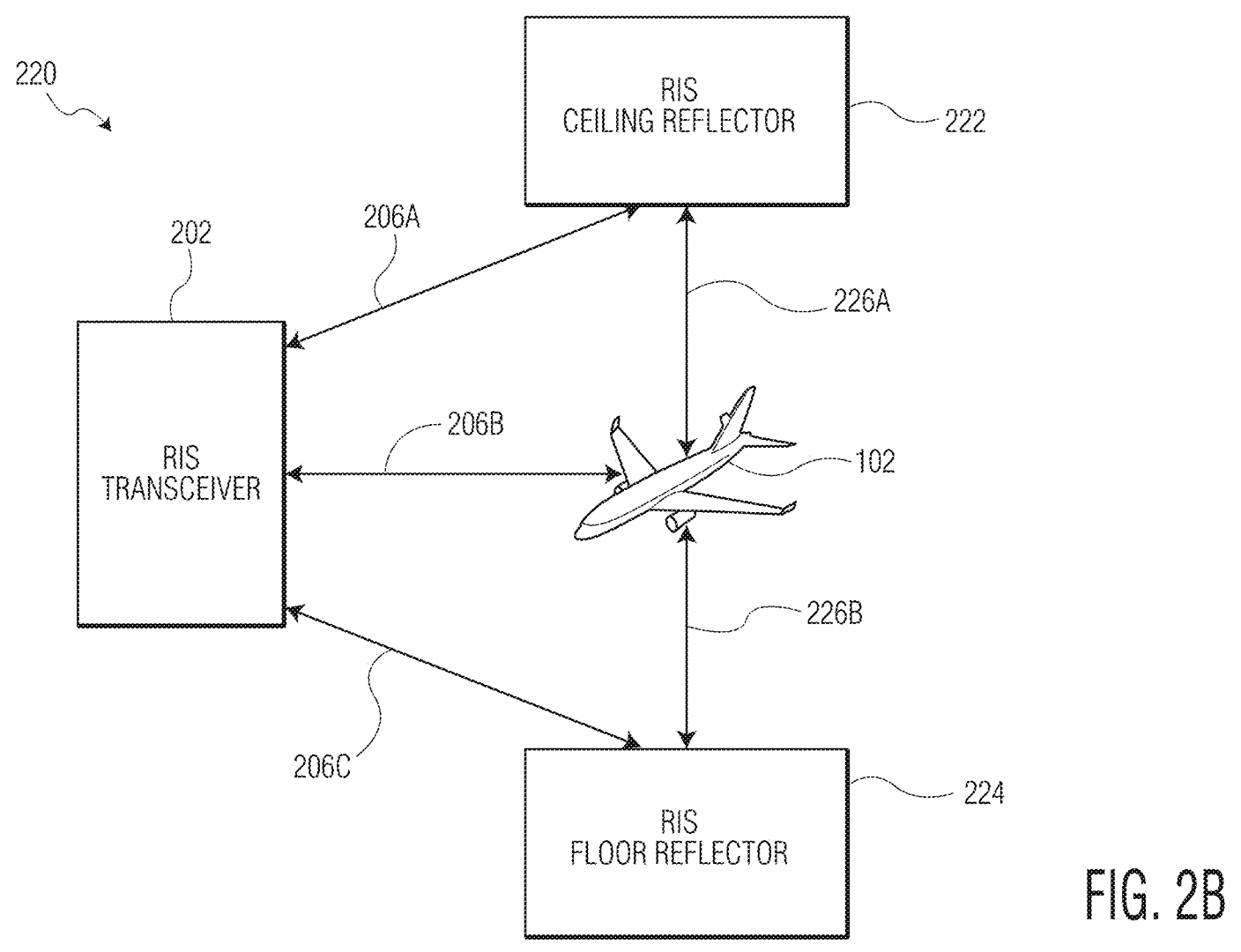
Figure 2C:
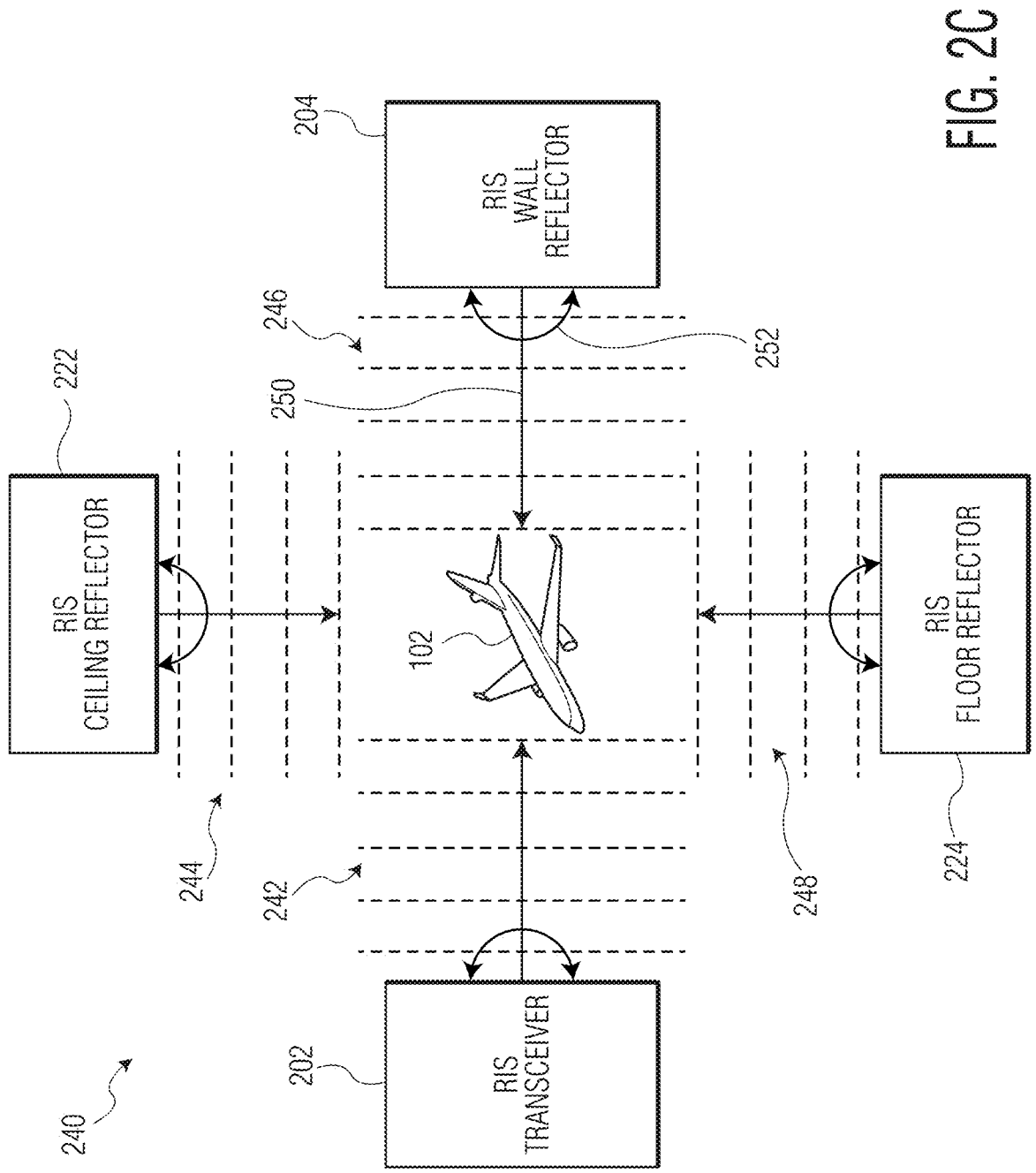
FIG. 2C shows a block diagram of an RCS measurement system including a transceiver, wall reflectors and ceiling/floor reflectors for performing RCS measurements of a target where the illumination angle of the EM wave relative to the target is adjustable, according to an example embodiment of the present disclosure.

As described above, at least one of the RIS panels is a transceiver, while the remaining RIS panels are reflectors. These reflectors may be positioned on the walls, ceiling and floor of the chamber. FIGS. 2A-2C show block diagrams of how the RIS transceiver interacts with the RIS reflectors to measure RCS in various illumination directions relative to the target.

In a first example, FIG. 2A shows a block diagram 200 of an RCS measurement system including a RIS transceiver 202 and a RIS wall reflector 204 for performing RCS measurements of a TUT 102, according to an example embodiment of the present disclosure. In this example, TUT 102 is a scale model of an airplane. TUT 102 is placed on the support (not shown) between RIS transceiver 202 and RIS wall reflector 204. It is noted that while only one RIS wall reflector 204 is shown for case of description, the chamber may include multiple (e.g., three) RIS wall reflectors surrounding TUT 102 that function in a similar manner to RIS wall reflector 204 described herein. When performing RCS measurements, RIS transceiver 202 enters a transmission mode and transmits an EM pulse in the form of a plane wave in the direction of TUT 102 and RIS wall reflector 204. After transmitting the pulse, RIS transceiver 202 enters reception mode and waits to receive reflections/scattering. Portions 206B of the EM plane wave are directly incident on TUT 102 and are reflected/scattered by the surface of TUT 102 directly back to RIS transceiver 202 for reception. Conversely, portions 206A and 206C of the EM plane wave do not hit TUT 102, but rather become incident on RIS wall reflector 204. Rather than simply reflecting the EM plane wave directly back to the transceiver, RIS wall reflector 204 is controlled to performing beam forming and reflect the EM plane wave as 208A/208B towards TUT 102 at a specific illumination direction (e.g., angle) relative to TUT 102. The EM plane wave 208A/208B incident on TUT 102 are reflected/scattered by the surface of TUT 102 back to RIS wall reflector 204 which then reflects the reflected/scattered wave back to RIS transceiver 202 for reception. In this example, the RIS transceiver 202 is able to directly measure the RCS for the front-side of TUT 102, while the RIS transceiver 202 and RIS wall reflector 204 work together to measure the RCS for the back-side of TUT 102.

Although not shown, a controller of the RCS measurement system controls the transmission/reception modes of RIS transceiver 202 and the illumination directions of RIS transceiver 202 and RIS wall reflector 204. In addition, the controller may perform time-domain gating of the received signals to isolate the source of the received signal based on the target and RIS locations in terms of propagation delays of the electromagnetic waves. For example, since wave portion 206B travels as shorter distance than wave portions 206A and 206C, wave portion 206B is received first followed by a delay after which wave portions 206A and 206C are received. Thus, the controller may designate the first signal received as being the direct reflections/scatterings from wave portion 206B, and the second signal received as being the reflections/scatterings from wave portions 206A and 206C. Any scattering/reflections received in between the delay may be ignored. This gating method is beneficial for analyzing the signals separately to compute the RCS for different surfaces of TUT 102 (i.e., the signals for different surfaces of the TUT are separated based on their reception time). It is noted that gating may be performed in hardware or software.

In a second example, FIG. 2B shows a block diagram 220 of an RCS measurement system including a RIS transceiver 202, a RIS floor reflector 224 and a RIS ceiling reflector 222 for performing RCS measurements of a TUT 102, according to an example embodiment of the present disclosure. In this example, TUT 102 is placed on the support (not shown) between the RIS transceiver 202, RIS ceiling reflector 222 and RIS floor reflector 224. When performing RCS measurements, RIS transceiver 202 enters transmission mode and transmits an EM plane wave as a pulse in the direction of TUT 102, RIS ceiling reflector 222 and RIS floor reflector 224. After transmitting the pulse, RIS transceiver 202 enters reception mode and waits to receive the reflections/scattering. Wave portions 206B of the EM plane wave is directly incident on TUT 102 and are reflected/scattered by the surface of TUT 102 back to RIS transceiver 202 for reception. Conversely, wave portions 206A and 206C of the EM plane wave do not hit TUT 102 but instead become incident on RIS ceiling reflector 222 and RIS floor reflector 224. Rather than simply reflecting the EM plane wave directly back to the transceiver, RIS ceiling reflector 222 and RIS floor reflector 224 are controlled to reflect the EM plane wave as wave portions 226A/226B towards TUT 102 at a specific illumination direction (e.g., angle) relative to TUT 102. The EM plane wave 226A/226B incident on TUT 102 are reflected/scattered by the surface of TUT 102 back to RIS ceiling reflector 222 and RIS floor reflector 224 which then reflect the reflected/scattered wave back to transceiver 202 for reception. In this example, the RIS transceiver 202 is able to directly measure the RCS for the front-side of TUT 102, while the RIS transceiver 202, RIS ceiling reflector 222 and RIS floor reflector 224 work together to measure the RCS for the top-side and bottom-side of TUT 102.

In a third example, FIG. 2C shows a block diagram 240 of an RCS measurement system including a RIS transceiver 202, RIS wall reflector 204, RIS floor reflector 224 and RIS ceiling reflector 222 for performing RCS measurements of a TUT 102 where the illumination angle of the EM wave relative to the TUT is adjustable, according to an example embodiment of the present disclosure. As mentioned above, the EM wave emitted by RIS transceiver 202 and RIS reflectors 204, 222 and 224 is a plane wave. This plane wave has an azimuth and elevation angle relative to the panels and relative to TUT 102. For example, plane waves 242, 244, 246 and 248 are shown in FIG. 2C to have an elevation angle of $0^0$ depicted by an arrow (e.g., arrow 250) pointing at TUT 102. In other words, the wavefront is in a plane parallel with the surface of the RIS transceiver and RIS reflectors and therefore hits TUT 102 straight on. However, as shown by the curved arrows (e.g., curved arrow 252), the elevation angle of plane waves 242, 244, 246 and 248 can be altered in both directions such that the wavefront is no longer in plane (in parallel) with the surface of the RIS transceiver and RIS reflectors and therefore hits TUT 102 from different angles of incidence (different illumination directions). This is beneficial for computing RCS from different points of view that may be observed by different radar systems in the field. For example, certain radar systems in the field may detect targets anywhere in the range between $0^0$-$90^0$ elevation. Thus, RCS measurements from each of these points of view are captured so that the radar systems in the field have access to target RCS measurements at any given angle of attack. Although not shown, it is noted that adjacent RIS panels can work together to produce a common plane wave. For example, a wall RIS reflector and floor RIS reflector may be controlled in such a manner to coordinate efforts and combine reflections to produce a plane wave for illuminating the target at an angle that may not be achievable with one RIS reflector alone. A similar EM interaction is also possible with the coordinated control of adjacent RIS transceivers.

Although not shown in FIG. 2C, plane waves 242, 244, 246 and 248 can be altered in the azimuth direction as well. This allows the RCS of TUT 102 to be measured for the entire 3D surface of TUT 102 at every conceivable combination of azimuth angle and elevation angle. This is beneficial for use in different radar systems in the field. For example, the measurements from the floor reflector may be beneficial for ground-based radar systems, whereas the measurements taken form the wall reflectors may be beneficial for air-based radar systems, while the measurements taken for the ceiling reflectors may be beneficial for satellite-based radar systems. This comprehensive RCS measurement is beneficial for many reasons including but not limited to aiding in target design and development. For example, the RCS measurement system aids in design, evaluation and verification of the development of new targets and/or modified targets (e.g., airplanes with new body designs, legacy airplanes with design modifications, etc.) with a goal of achieving a desired (e.g., reduced) RCS. In another example, the RCS measurement system also ensures that in practice, the field radar can choose an appropriate TUT RCS having an illumination direction that directly corresponds to the field radar illumination direction, thereby ensuring a proper comparison between the measured RCS of the TUT and the field detected RCS of the actual target. This allows the field radar system to more accurately determine the identity of the actual target.

Figure 3:
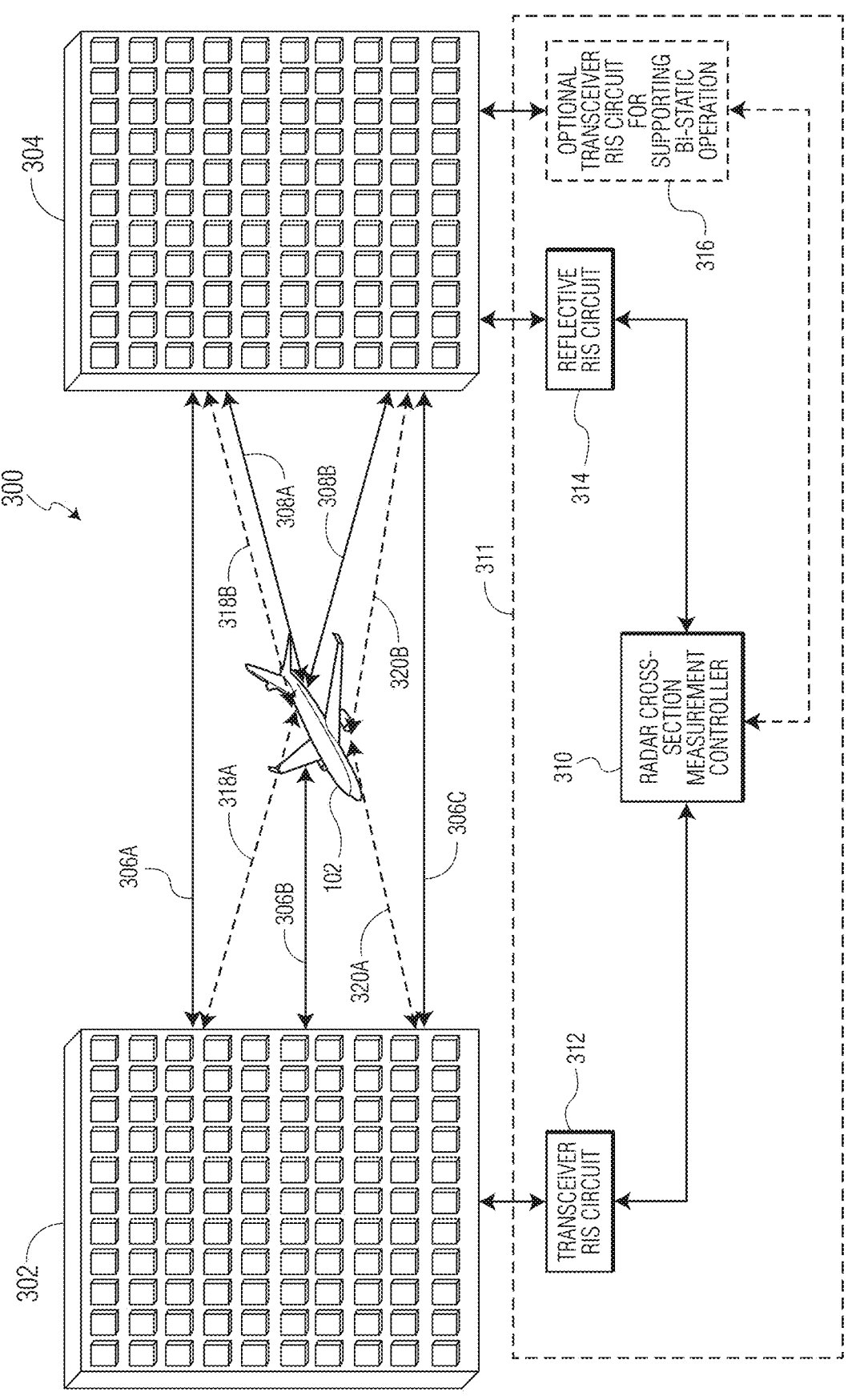
FIG. 3 shows a block diagram of an RCS measurement system including a transceiver, a wall reflector and a control system for performing RCS measurements of a target, according to an example embodiment of the present disclosure.

FIG. 3 shows a block diagram 300 of an RCS measurement system including a RIS transceiver 302, a RIS wall reflector 304 and a control system 311 for performing RCS measurements of a TUT, according to an example embodiment of the present disclosure. As mentioned above, the RCS measurement system includes one or more controllers for controlling operation of the RIS transceiver and RIS reflectors. Similar to FIG. 1, FIG. 3 also shows a RIS transceiver 302 transmitting a plane wave in directions 306A, 306B and 306C towards TUT 102, and RIS reflector 304 redirecting the plane waves as 308A and 308B towards TUT 102 and back to RIS transceiver 302 for use in RCS computations.

In this example, RIS transceiver 302 includes transceiver RIS circuit 312, while RIS reflector 304 includes reflector RIS circuit 314. Transceiver RIS circuit 312 may include electronic components (e.g., receiver, transmitter, etc.) to facilitate transmission and reception of EM waves. Both transceiver RIS circuit 312 and reflector RIS circuit 314 may include electronic components (e.g., variable capacitors, PIN diodes, etc.) to facilitate controlling the impedance of the reflective elements. Both transceiver RIS circuit 312 and reflector RIS circuit 314 are controlled by RCS measurement controller 310 which may include electronic components (e.g., processor, memory, interfaces, etc.) to facilitate coordinated control of RIS transceiver 302 and RIS reflector 304. Although not shown, each of the RIS reflectors in the chamber have a similar reflective RIS circuit for their control.

The examples described above have been describing monostatic radar measurements where the EM plane wave is transmitted by a transceiver, reflected by various reflectors and then received by the same transceiver. In other words, the EM plane wave is transmitted and ultimately received by the same RIS panel. However, certain radar systems operate in bi-static mode where one transceiver transmits the EM plane wave, while another remotely located transceiver receives the reflected/scattered EM plane wave.

The RCS measurement system disclosed herein can also be configured to perform bi-static RCS measurements. In order to support bi-static RCS measurements, RIS reflector 304 may include optional transceiver RIS circuit 316 for facilitating transmission/reception at RIS reflector 304. In other words, RIS reflector 304 has similar transmission/reception functionality as RIS transceiver 302. In one example, during bi-static operation, RCS measurement controller 310 may control transceiver RIS circuit 312 to emit an EM plane wave as 318A and 320A from RIS transceiver 302. This plane wave is reflected/scattered as 318B and 320B and received by optional transceiver RIS circuit 316 via RIS reflector 304. The transmission may also occur in the opposite direction, with the RIS reflector 304 acting as the transmitter, and the RIS transceiver 302 acting as the receiver. In either case, upon receiving the reflected/scattered waves, RCS measurement controller 310 computes the RCS for TUT 102. This configuration allows RCS measurement system to determine the RCS for a target for various bi-static radar transmitter/receiver positioning configurations.

Although not shown in FIG. 3, RCS measurement controller 310 may also control the reflective RIS circuits of other RIS reflectors (e.g., other wall/ceiling/floor RIS reflectors) and/or the transceiver RIS circuits of other RIS transceivers (e.g., other wall/ceiling/floor RIS transceivers) in a similar manner. In addition, the control of these RIS transceivers and RIS reflectors is coordinated to ensure capturing an accurate and complete monostatic and/or bi-static RCS for TUT 102.

Figure 4:
FIG. 4 shows a block diagram of the control system in FIG. 3, according to an example embodiment of the present disclosure.

FIG. 4 shows a block diagram 400 of the control system 311 in FIG. 3, according to an example embodiment of the present disclosure. RCS measurement controller 310 may include processor 414, memory 416, transceiver input/output (I/O) 418, user I/O 420 and reflector I/O 422. Transceiver RIS circuit 312 may include transmitter circuit 402 for transmitting an RF pulse, receiver circuit 404 for receiving an RF pulse, circulator 406 for coupling the transmitter circuit 402 or receiver circuit 404 to the RIS reflector elements, divider/combiner 408 including phase shifters (e.g., variable capacitors) for changing the impedance of the RIS reflector elements, and polarization switch 410 coupled to RIS reflector elements (not shown). Polarization switch 410 changes the polarization of the EM wave emitted by the RIS reflector elements. Likewise, reflective RIS circuit 314 includes variable capacitance elements 412 (e.g., variable capacitors, PIN diodes, etc.) connected to each of the RIS reflector elements of the RIS reflector panel 304 (not shown).

During operation, processor 414 of RCS measurement controller 310 receives instructions from a user (e.g., RF engineer) to initiate RCS measurements of TUT 102. In response to these instructions, processor 414 transmits control signals to transceiver RIS circuit 312 and reflective RIS circuit 314 via transceiver I/O 418 and reflector I/O 422 respectively. These control signals control transmitter 402, circulator 406, divider/combiner 408 and polarization switch 410 of RIS transceiver panel 302 to transmit a plane wave at TUT 102. These control signals also control variable capacitor elements 412 of RIS reflector panel 304 to redirect the incident plane wave towards a surface of the TUT and back to RIS transceiver panel 302. Processor 414 also controls receiver 404, circulator 406, divider/combiner 408 and polarization switch 410 of RIS transceiver panel 302 to receive the plane wave where the corresponding signals of the received wave are received via transceiver I/O 418 and stored in memory 416 for further processing. Processor 414 then processes the amplitude and phase of these received signals along with other signals from other illumination directions of TUT 102 to compute the RCS of TUT 102.

As mentioned above, the RCS measurement system can operate in both a monostatic (same transmitter/receiver) configuration and bistatic (separated transmitter/receiver) configuration. This is beneficial, because in the field, some radar systems are monostatic, while other radar systems are bistatic. Thus, RCS signatures for TUT 102 may be measured in both monostatic and bistatic modes. The details of the monostatic and bistatic RCS measurements are described in FIGS. 5 and 6 below.

Figure 5:
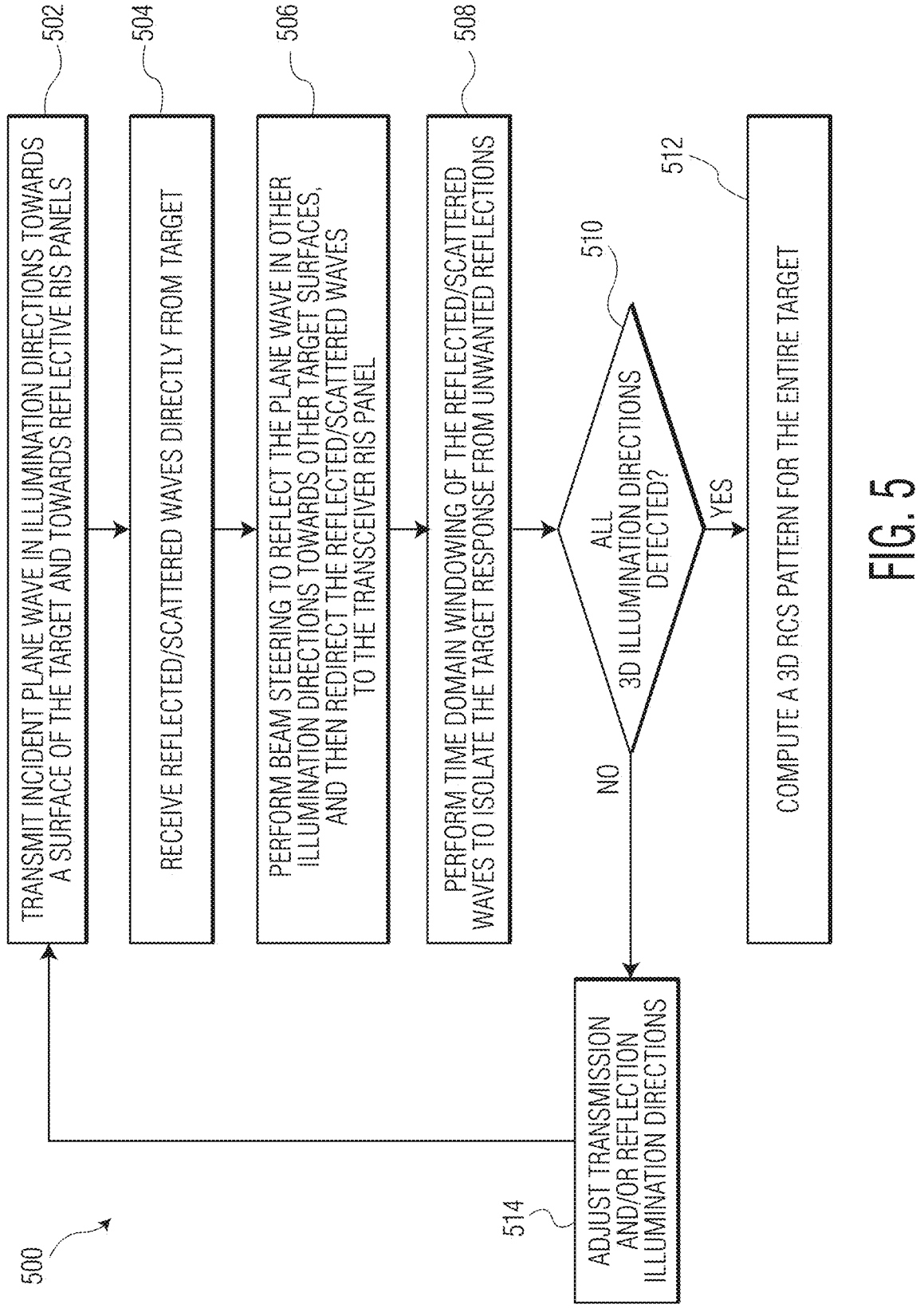
FIG. 5 shows a flowchart for performing monostatic RCS measurements, according to an example embodiment of the present disclosure.

FIG. 5 shows a flowchart 500 for performing monostatic RCS measurements, according to an example embodiment of the present disclosure. In step 502, a RIS transceiver transmits an incident plane wave in an illumination direction (e.g., specific azimuth and elevation angle) towards TUT 102 and RIS reflectors (e.g., wall, ceiling and floor RIS panels). In step 504, the RIS transceiver receives the reflected/scattered waves directly from TUT 102. In step 506, the RIS reflectors perform beam steering to reflect the plane wave in various illumination directions towards other target surfaces of TUT 102 that are not directly in the line of sight of the RIS transceiver. These RIS reflectors then redirect the reflected/scattered waves back to the RIS transceiver. In step 508, the RCS measurement controller performs time domain windowing of the received signals to isolate the target responses from unwanted reflections. For example, the RCS measurement controller knows the time delay from when the wave is transmitted to when reflections are received directly from TUT 102 and from the various RIS reflector panels based on the known distances between the RIS transceiver panel, TUT 102 and the RIS reflector panels. The RCS measurement controller can therefore set time windows for receiving and sorting these signals to determine how the signals relate to the corresponding surfaces of TUT 102. In step 510, RCS measurement controller determines if all 3D illumination directions (the entire TUT surface from all six sides and azimuth and elevation angles) have been measured or not. If yes, the RCS measurement controller computes the 3D RCS for the target in step 512. If no, the RCS measurement controller adjusts the illumination directions (e.g., adjusts azimuth/elevation of the plane wave from all sides of the TUT) in step 514 and repeats the measurement process.

Figure 6:
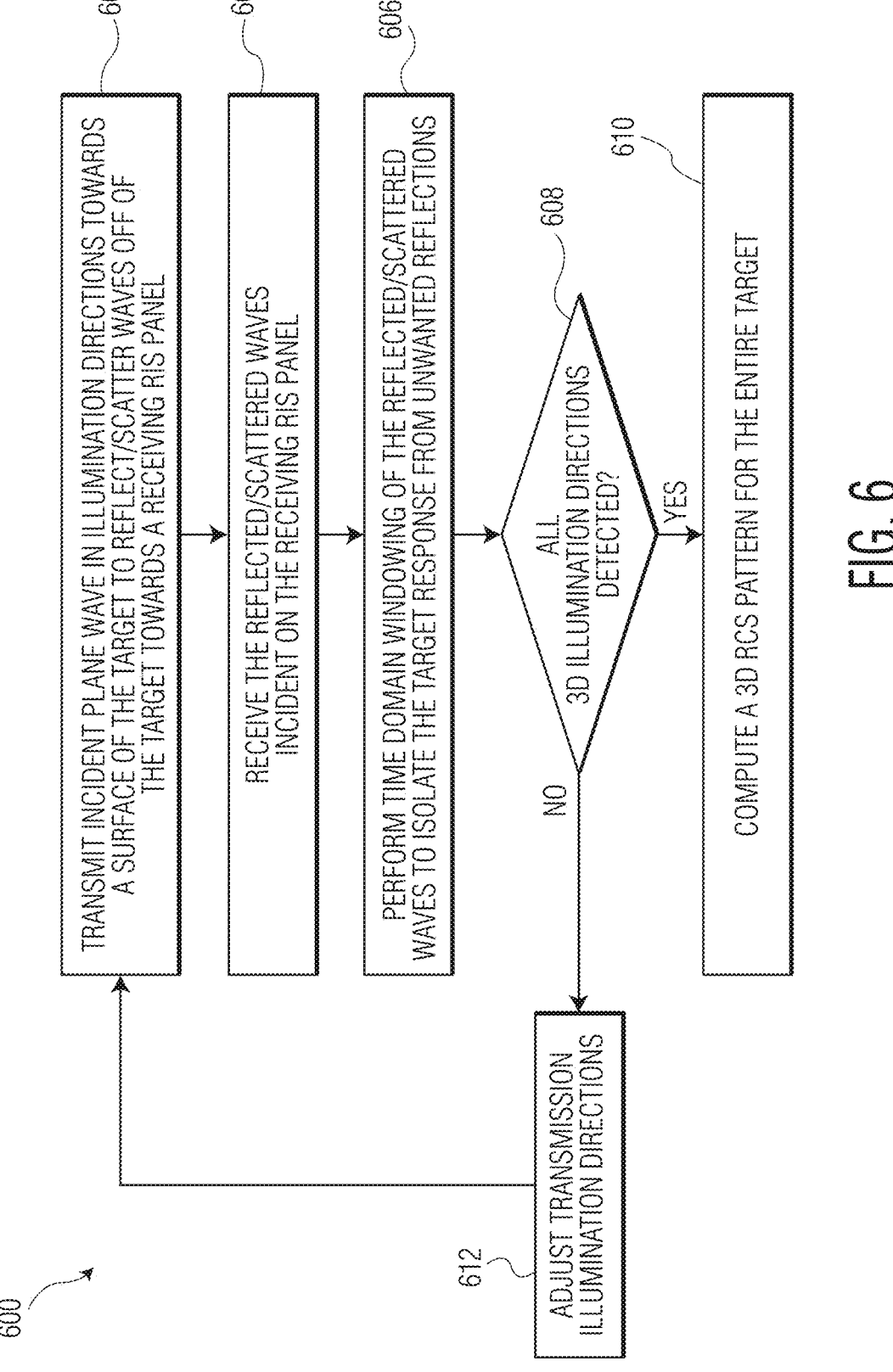
FIG. 6 shows a flowchart for performing bi-static RCS measurements, according to an example embodiment of the present disclosure.

FIG. 6 shows a flowchart 600 for performing bi-static RCS measurements, according to an example embodiment of the present disclosure. In step 602, a first RIS transceiver transmits an incident plane wave in an illumination direction (e.g., specific azimuth and elevation angle) towards TUT 102 and towards a second RIS transceiver (e.g., wall, ceiling and floor RIS panels). In step 604, the second RIS transceiver receives the reflected/scattered waves directly from TUT 102. In step 606, the RCS measurement controller performs time domain windowing of the received signals to isolate the target responses from unwanted reflections. In step 608, RCS measurement controller determines if all 3D illumination directions (the entire TUT surface from all sides and azimuth and elevation angles) have been measured or not. If yes, the RCS measurement controller computes the 3D RCS for the target in step 610. If no, the RCS measurement controller adjusts the illumination directions in step 612 and repeats the measurement process.

It is noted that adjusting the illumination directions may include adjusting the azimuth/elevation between the first and second RIS transceivers described above, and/or using other RIS transceiver pairs. For example, RCS measurements can be taken from the front-side RIS transceiver panel and the back-side RIS transceiver panel pair, or from another pair such as the left-side RIS transceiver panel and the right-side RIS transceiver panel. Also, the direction of the bi-static transmission can be reversed (e.g., the second transceiver may act as the transmitter, while the first transceiver may act as the receiver). This allows bi-static RCS measurements to be taken from every conceivable illumination direction.

It is noted that the RCS measurement system described herein is highly configurable to accommodate all variations of radar systems in the field. In one example, the RCS measurement system described herein works in various RF bands including but not limited to the C, X and Ku radar bands (e.g., bands according to IEEE Standard radar-frequency letter band nomenclature). Performing measurements in different bands is accomplished by grouping reflective elements within the RIS transceiver and RIS reflectors to form a broadband antenna. For example, 4 reflective elements may be grouped and controlled simultaneously for achieving measurements in one specific RF band, while 8 reflective elements may be grouped and controlled simultaneously for achieving measurements in another specific RF band. In another example, the RCS measurement system described herein also supports measurements in various polarizations. For example, the reflective elements of the RIS transceiver and RIS reflectors can be controlled to create a plane wave with vertical polarization or horizontal polarization.

In addition, it is noted that the RCS measurement system described herein can perform various RCS measurements either simultaneously or sequentially. For example, RCS measurements can be taken simultaneously from various RIS reflector panels that are simultaneously active. This is achieved by time domain gating the received signals so that they can be sorted and processed by the controller. Conversely, and in order to avoid unwanted interference that may occur, RCS measurements can be taken sequentially from various RIS reflector panels that are sequentially activated/deactivated at different times (e.g., back-side panel activated/deactivated, followed by left-side panel activated/deactivated, etc.).

The RCS measurement controller described herein computes the 3D RCS from the measured intensity and phase of the received signals at each of the individual RIS elements to specific incidence on the surface of the TUT. Essentially, a pulse measurement for a particular direction (e.g., specific side and azimuth/elevation angle) maps to a 2D mosaic image of values based on the intensity and phase of the received scattered wave from particular incidence on the surface of the TUT. It is noted that the method of computing the RCS based on the intensity and phase of the received signals may be based on known RCS algorithms apparent to one of ordinary skill in the art. These algorithms effectively utilize the received signals to determine and quantify a targets ability to reflect RF waves at specific incidence of the surface of the target.

The computed RCS measurement system described herein may be beneficially utilized in various applications including aiding in target design and development. For example, in the design, evaluation and verification of the development of new targets and/or modified targets, the mosaic image values can be captured and analyzed to determine RCS performance of various target designs (e.g., body geometry, materials, etc.). These RCS values may be compared throughout different stages of the development process to determine how design changes affect the RCS. In another example, these mosaic image values can also be compared to field measurements taken by radar systems to determine matches between the field target and a particular signature known to the radar system based on the previously conducted RCS measurements for various TUTs. In other words, the RCS measurements made by the field radar system are compared to the RCS measurements for various TUTs to find a match, thereby allowing the field radar to accurately identify the actual target. This comparison may be performed based on single RCS measurement or a sequence of RCS measurements captured as the field target is moving. In addition, the 2D mosaic images can be stitched together to form a 3D image viewable by the end user.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A radar cross-section (RCS) measurement system comprising:
    a reconfigurable intelligent surface (RIS) transceiver positioned relative to a first illumination direction of a target under test (TUT);
    a RIS reflector positioned relative to a second illumination direction of the TUT; and
    a controller configured to:
        control the RIS transceiver to transmit an electromagnetic (EM) wave towards the first illumination direction of the TUT and the RIS reflector,
        control the RIS reflector to reflect the EM wave received from the RIS transceiver towards the second illumination direction of the TUT,
        control the RIS reflector to reflect a scattering of the EM wave received from the second illumination direction of the TUT back to the RIS transceiver, and
        compute the RCS of the TUT in the second illumination direction of the TUT based on the scattering of the EM wave received from the RIS reflector.

2. The system of claim 1, wherein the controller is further configured to compute the RCS of the TUT in the first illumination direction of the TUT based on a scattering of the EM wave received from the first illumination direction of the TUT.

3. The system of claim 1, further comprising:
    a plurality of RIS reflectors including the RIS reflector and at least one additional RIS reflector, the plurality of RIS reflectors respectively positioned relative to a plurality of illumination directions of the TUT, wherein the controller is further configured to:

control the plurality of RIS reflectors to reflect the EM wave received from the RIS transceiver towards the plurality of illumination directions of the TUT, control the plurality of RIS reflectors to reflect a plurality of scatterings of the EM wave received from the plurality of illumination directions of the TUT back to the RIS transceiver, and compute a plurality of RCSs of the TUT in the plurality of illumination directions of the TUT based on plurality of scatterings of the EM wave received from the plurality of illumination directions of the TUT.

4. The system of claim 3, wherein the plurality of illumination directions includes at least six illumination directions, and the computed RCS of the TUT is a three-dimensional RCS computed with respect to the six illumination directions.

5. The system of claim 1, wherein the controller is further configured to control an angle of reflection of the RIS reflector by adjusting impedance of respective reflective elements of the RIS reflector.

6. The system of claim 1, wherein the RIS reflector is configured to receive EM waves and the controller is further configured to measure a bi-static radar RCS of the TUT by processing the scattering of the EM wave from the second illumination direction of the TUT received by the RIS reflector.

7. The system of claim 1, wherein the EM wave has vertical polarization or horizontal polarization and the controller is further configured to compute a vertical polarization RCS or a horizontal polarization RCS of the TUT.

8. The system of claim 1, wherein the controller is further configured to control the RIS transceiver and RIS reflector to control an angle of incidence of the EM wave on the TUT.

9. The system of claim 1, wherein the RIS transceiver transmits in a plurality of RF bands, and the RIS reflector reflects in the plurality of RF bands.

10. The system of claim 1, further comprising:

a support for statically positioning the TUT relative to the RIS transceiver and RIS reflector during the RCS measurement.

11. The system of claim 1, wherein the controller is configured to:

control the RIS transceiver to transmit the EM wave in a specified frequency band; and control the RIS reflector to reflect the EM wave in the specified frequency band, wherein the specified frequency band is adjustable.

12. A radar cross-section (RCS) measurement system comprising:

a first reconfigurable intelligent surface (RIS) transceiver positioned relative to a first illumination direction of a target under test (TUT);

a second RIS transceiver positioned relative to a second illumination direction of the TUT; and a controller configured to:

control the first RIS transceiver to transmit an electromagnetic (EM) wave towards the first illumination direction of the TUT and the second RIS transceiver, control the second RIS transceiver to receive a scattering of the EM wave received from the TUT, and compute the RCS of the TUT in the first illumination direction of the TUT based on the scattering of the EM wave received from the TUT.

13. The system of claim 12, wherein the controller is further configured to:

control the second RIS transceiver to transmit an EM wave towards the second illumination direction of the TUT and the first RIS transceiver, control the first RIS transceiver to receive a scattering of the EM wave received from the TUT, and compute the RCS of the TUT in the second illumination direction of the TUT based on the scattering of the EM wave received from the TUT.

14. The system of claim 12, further comprising:

a plurality of RIS transceivers including the first RIS transceiver, the second RIS transceiver and at least one additional RIS transceiver, the plurality of RIS transceivers respectively positioned relative to a plurality of illumination directions of the TUT, wherein the controller is further configured to:

control the plurality of RIS transceivers to transmit and receive the EM wave towards the plurality of illumination directions of the TUT, and compute a plurality of RCSs of the TUT in the plurality of illumination directions of the TUT based on plurality of scatterings of the EM wave received from the plurality of illumination directions of the TUT.

15. The system of claim 14, wherein the plurality of illumination directions includes at least six illumination directions and the computed RCS of the TUT is a three-dimensional RCS computed with respect to the six illumination directions.

16. The system of claim 12, wherein the controller is further configured to control an angle of reflection of the RIS reflector by adjusting impedance of respective reflective elements of the RIS reflector.

17. The system of claim 12, wherein the EM wave has vertical polarization or horizontal polarization and the controller is further configured to compute a vertical polarization RCS or a horizontal polarization RCS of the TUT.

18. The system of claim 12, wherein the controller is further configured to control the first RIS transceiver and the second RIS transceiver to control an angle of incidence of the EM wave on the TUT.

19. The system of claim 12, wherein the first RIS transceiver and the second RIS transceiver transmit in a plurality of RF bands.

20. The system of claim 12, wherein the TUT is statically positioned relative to the first RIS transceiver and the second RIS transceiver during the RCS measurement.

* * * * *